(12) United States Patent
Lawrenson et al.

(10) Patent No.: US 11,557,214 B2
(45) Date of Patent: Jan. 17, 2023

(54) INFORMATION PROCESSING APPARATUS AND METHOD FOR PROCESSING INFORMATION

(71) Applicant: SONY CORPORATION, Tokyo (JP)

(72) Inventors: Matthew Lawrenson, Bussigny (CH); Masaaki Isozu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 547 days.

(21) Appl. No.: 16/491,071

(22) PCT Filed: Dec. 27, 2017

(86) PCT No.: PCT/JP2017/047029
§ 371 (c)(1),
(2) Date: Sep. 4, 2019

(87) PCT Pub. No.: WO2018/168157
PCT Pub. Date: Sep. 20, 2018

(65) Prior Publication Data
US 2020/0013302 A1     Jan. 9, 2020

(30) Foreign Application Priority Data
Mar. 13, 2017 (JP) .............................. JP2017-047239

(51) Int. Cl.
*G09B 5/00* (2006.01)
*H04L 67/104* (2022.01)

(52) U.S. Cl.
CPC .............. *G09B 5/00* (2013.01); *H04L 67/104* (2013.01)

(58) Field of Classification Search
CPC .................................. G09B 5/00; G09B 7/00
See application file for complete search history.

(56) References Cited

U.S. PATENT DOCUMENTS

| | | | |
|---|---|---|---|
| 2004/0214152 A1 | 10/2004 | Hoyashita et al. | |
| 2012/0233665 A1* | 9/2012 | Ranganathan | G06F 21/51 726/4 |
| 2015/0099255 A1* | 4/2015 | Aslan | G06Q 50/01 434/350 |
| 2016/0283920 A1* | 9/2016 | Fisher | H04L 9/3297 |

(Continued)

FOREIGN PATENT DOCUMENTS

| | | |
|---|---|---|
| CN | 1437143 A | 8/2003 |
| EP | 1351208 A2 | 10/2003 |
| JP | 2005-321768 A | 11/2005 |

(Continued)

OTHER PUBLICATIONS

Sharples, Mike, et. al., The Blockchain and Kudos: A Distributed System for Educational Record, Reputation and Reward, Adaptive and Adaptable Learning: 11th European Conference on Technology Enhanced Learning Sep. 13-16, 2016 (Year: 2016).*

(Continued)

*Primary Examiner* — Omkar A Deodhar
(74) *Attorney, Agent, or Firm* — Chip Law Group

(57) ABSTRACT

There is provided an information processing apparatus including a processor that obtains, from a first P2P database, evaluation information for evaluating learning of a user, which is obtained by an acquisition device, and performs evaluation on learning performed by the user on the basis of the evaluation information.

19 Claims, 11 Drawing Sheets

(56) References Cited

U.S. PATENT DOCUMENTS

2017/0331896 A1* 11/2017 Holloway ............... H04L 9/12
2018/0323964 A1* 11/2018 Watanabe ............ G06Q 20/065

FOREIGN PATENT DOCUMENTS

| | | |
|---|---|---|
| JP | 3772205 B2 | 5/2006 |
| JP | 2012-133251 A | 7/2012 |
| JP | 2012-173333 A | 9/2012 |
| JP | 2013-242434 A | 12/2013 |
| JP | 2016-224142 A | 12/2016 |
| KR | 10-2003-0067497 A | 8/2003 |

OTHER PUBLICATIONS

Fu, Dongqi et. al., Blockchain-based Trusted Computing in Social Network, 2016 2nd IEEE International Conference on Computer and Communications, 2016 (Year: 2016).*

Hamaji, et al., "A Grouping Method for Effective Learning Based on Operations of a Collaborative Learning System", Information Processing Society of Japan, Technical Report, vol. 2007, No. 12, Feb. 17, 2007, pp. 163-168.

"Sony Global Education Developed technology to reach learning and open activity records by blockchain", Sony Global Education, Feb. 22, 2016, 05 pages.

Audrey Watters, "The Blockchain for Education: An Introduction", Hackeducation.com, Apr. 7, 2016, 12 pages.

"The world | where a block chain changes education and learning serves as virtual currency", The report from the greatest educational event in the 2016 U.S, URL: http://virtualmoney.jp/I0001394, Oct. 24, 2016, 06 pages.

Office Action for JP Patent Application No. 2017-047239, dated Apr. 27, 2021, 05 pages of English Translation and 05 pages of Office Action.

Sharples, et al., "The Blockchain and Kudos: A Distributed System for Educational Record, Reputation and Reward", European Conference on Technology Enhanced Learning, XP47354809, Sep. 7, 2016, pp. 490-496.

"Sony Global—Sony Global Education Develops Technology Using Blockchain for Open Sharing of Academic Proficiency and Progress Records", Sony Global Education, URL: https://www.sony.net/SonyInfo/News/Press/201602/16-0222E/, XP55542651, Feb. 22, 2016, 02 pages.

Audrey Watters, "The Blockchain for Education: An Introduction", hackeducation.com, XP55542182, Apr. 7, 2016, 14 pages.

Office Action for EP Patent Application No. 17900361.1, dated Jul. 9, 2020, 08 pages of Office Action.

"Sony Global Education Develops Technology Using Blockchain for Open Sharing of Academic Proficiency and Progress Records", Sony Global Education, XP55542651,Sony News Releases, Feb. 22, 2016, 02 pages.

Sharples, et al., "The Blockchain and Kudos: A Distributed System for Educational Record, Reputation and Reward", European Conference on Technology Enhanced Learning, XP047354809, Sep. 7, 2016, pp. 490-496.

Extended European Search Report of EP Application No. 17900361.1, dated Nov. 20, 2019, 11 pages.

International Search Report and Written Opinion of PCT Application No. PCT/JP2017/047029, dated Apr. 3, 2018, 09 pages of ISRWO.

Hamaji Yuki, "A Grouping Method for Effective Learning Based on Operations of A Collaborative Learning System", Research report of Information Processing Society of Japan, vol. 2007, No. 12, Feb. 17, 2007, pp. 163-168.

"Learning achievement by blockchain and development on technology for opening activity record", Sony Global Education, Inc, Feb. 22, 2016.

"World where blockchain changes education and studying becomes virtual currency", Report from greatest educational event in US 2016, Oct. 24, 2016, 01 page.

Audrey Watters , "The Blockchain for Education: An Introduction", http://hackeducation.com/2016/04/07/blockchain-education-guide, Apr. 7, 2016, 12 pages.

* cited by examiner

FIG. 10

| LEARNING METHOD | EVALUATION CONDITION | DEVICE CONDITION |
|---|---|---|
| VIDEO VIEWING | ·VIEWED VIDEO IS VIDEO RELATED TO PREDETERMINED TOPIC<br>·NO VIEWING OF ANOTHER VIDEO IS DETECTED<br>·NO MOVEMENT OF USER IS DETECTED<br>·PUBLIC FIRST BLOCKCHAIN IS INCLUDED | ·WEARABLE DEVICE<br>·SERVER |
| READING | ·READ BOOK IS BOOK RELATED TO PREDETERMINED TOPIC<br>·NO MOVEMENT OF USER IS DETECTED<br>·NO USE OF STATIONARY DEVICE IS DETECTED<br>·LINE OF SIGHT OF USER IS DIRECTED TO EVALUATION DEVICE | ·WEARABLE DEVICE<br>·IMAGING DEVICE<br>·PLURALITY OF STATIONARY DEVICES |
| PARTICIPATION IN LECTURE | ·TAKEN LECTURE IS LECTURE RELATED TO PREDETERMINED TOPIC<br>·NO MOVEMENT OF USER IS DETECTED<br>·NO USE OF ACQUISITION DEVICE IS DETECTED | ·SMARTPHONE<br>·WEARABLE DEVICE |
| ... | ... | ... |

FIG. 11

| USER ID | abc1234 |
|---|---|
| TOPIC (CATEGORY) | ENGLISH |
| TOPIC (SUB-CATEGORY) | PASSIVE |
| USED DEVICE | ·WEARABLE TERMINAL<br>·REFRIGERATOR |
| CREDIBILITY OF EVALUATION INFORMATION | 80 |
| DEGREE OF UNDERSTANDING | 75 |
| LEARNING TIME | 10 HOURS |
| LEARNING METHOD | VIDEO VIEWING |

INFORMATION PROCESSING APPARATUS AND METHOD FOR PROCESSING INFORMATION

CROSS REFERENCE TO RELATED APPLICATIONS

This application is a U.S. National Phase of International Patent Application No. PCT/JP2017/047029 filed on Dec. 27, 2017, which claims priority benefit of Japanese Patent Application No. JP 2017-047239 filed in the Japan Patent Office on Mar. 13, 2017. Each of the above-referenced applications is hereby incorporated herein by reference in its entirety.

TECHNICAL FIELD

The present disclosure relates to an information processing apparatus, and a method for processing information.

BACKGROUND ART

In general, an acquisition level of learning is evaluated on the basis of a curriculum or a syllabus defined by a school or a public institution equivalent to the school. For example, a learner (hereinafter also referred to as user) participates in a 10-hour lecture prescribed by a curriculum or a syllabus, and then takes an examination, whereby the acquisition level of the learning of the learner is evaluated on the basis of the score of the examination.

However, in recent years, there has been developed a system that evaluates an acquisition level of learning on the basis of a method other than the examination as described above.

Patent Document 1 discloses a system that uses a simulator to evaluate a degree of learning of a learner (particularly medical worker). In the system disclosed in Patent Document 1, a medical worker responds to various situations presented by the simulator, whereby the acquisition level of learning of the medical worker is evaluated.

CITATION LIST

Patent Document

Patent Document 1: U.S. Patent Application Laid-Open No. 2011/189638

SUMMARY OF THE INVENTION

Problems To Be Solved By The Invention

In the technique disclosed in Patent Document 1, as described above, a simulator is prepared according to the content managed by a predetermined institution. Therefore, in the technique disclosed in Patent Document 1, learning of the learner is evaluated on the basis of the content managed by the predetermined institution. However, evaluation of learning of the learner based on the content managed by the predetermined institution may be insufficient in evaluating the learning of the learner.

In view of the above, the present disclosure proposes information processing apparatus and a method for processing information capable of appropriately evaluating learning of a user on the basis of wide-ranging information.

Solutions To Problems

According to the present disclosure, there is provided an information processing apparatus including a processor that obtains, from a first P2P database, evaluation information for evaluating learning of a user, which is obtained by an acquisition device, and performs evaluation on learning performed by the user on the basis of the evaluation information.

Furthermore, according to the present disclosure, there is provided a method for processing information that causes a computer to obtain, from a first P2P database, evaluation information for evaluating learning of a user, which is obtained by an acquisition device, and to perform evaluation on learning performed by the user on the basis of the evaluation information.

Effects of the Invention

According to the present disclosure, learning of the user is evaluated on the basis of wide-ranging information.

Note that the effect described above is not necessarily limited, and any of the effects described in the present specification or another effect that can be understood from the present specification may be exerted in addition to the effect described above or instead of the effect described above.

BRIEF DESCRIPTION OF DRAWINGS

FIG. 10 is a diagram illustrating an exemplary evaluation table referred to in information processing according to the embodiment of the present disclosure.

FIG. 11 is a table illustrating exemplary information registered in a blockchain according to the embodiment of the present disclosure.

MODE FOR CARRYING OUT THE INVENTION

Hereinafter, a preferred embodiment of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Note that descriptions will be given in the following order.
0. Overview of Peer-to-Peer Database
1. Overview of Learning Evaluation System
2. Configuration of Devices Included in Learning Evaluation System
3. Method for Processing Information in Learning Evaluation System
4. Hardware Configuration of Evaluation Device
5. Supplementary Items
6. Conclusion <0. Overview of Peer-to-Peer Database>

A learning management system according to the present embodiment uses a distributed peer-to-peer database distributed in a peer-to-peer network. Note that the peer-to-peer network may be called a peer-to-peer distributed file system. Hereinafter, the peer-to-peer network may be referred to as a "P2P network", and the peer-to-peer database may be referred to as a "P2P database". As an example of the P2P database, blockchain data distributed in the P2P network may be used. In view of the above, a blockchain system will be described first.

Figure 1:
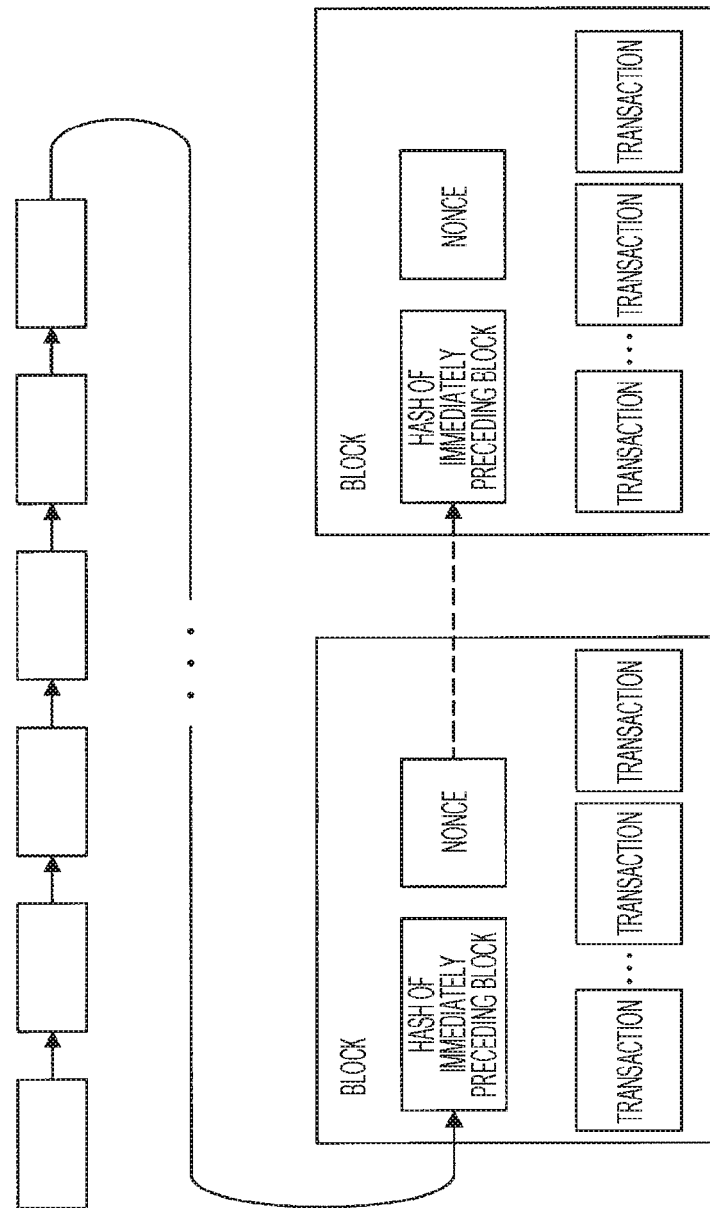
FIG. 1 is a diagram schematically illustrating a blockchain system according to an embodiment of the present disclosure.

As illustrated in FIG. 1, blockchain data according to the present embodiment is data including a plurality of blocks continuously arranged in chains. One or more target data can be stored in each block as a transaction.

Examples of the blockchain data according to the present embodiment include blockchain data used for exchange of data of virtual currency, such as Bitcoin. The blockchain data used for exchange of data of virtual currency includes, for example, a hash of the immediately preceding block, and a special value called a nonce. The hash of the immediately preceding block is used to determine whether or not it is a "correct block" in a correct sequence from the immediately preceding block. A nonce is used to prevent impersonation in authentication using a hash, and tampering is prevented by using the nonce. Examples of the nonce include data indicating a character string, a numerical string, or a combination thereof.

Furthermore, in the blockchain data, data of each transaction is subject to application of an electronic signature using an encryption key, or is encrypted using an encryption key. Furthermore, data of each transaction is published and shared across the entire P2P network. Note that, depending on the blockchain system, the same record may not necessarily be held in the entire P2P network.

Figure 2:
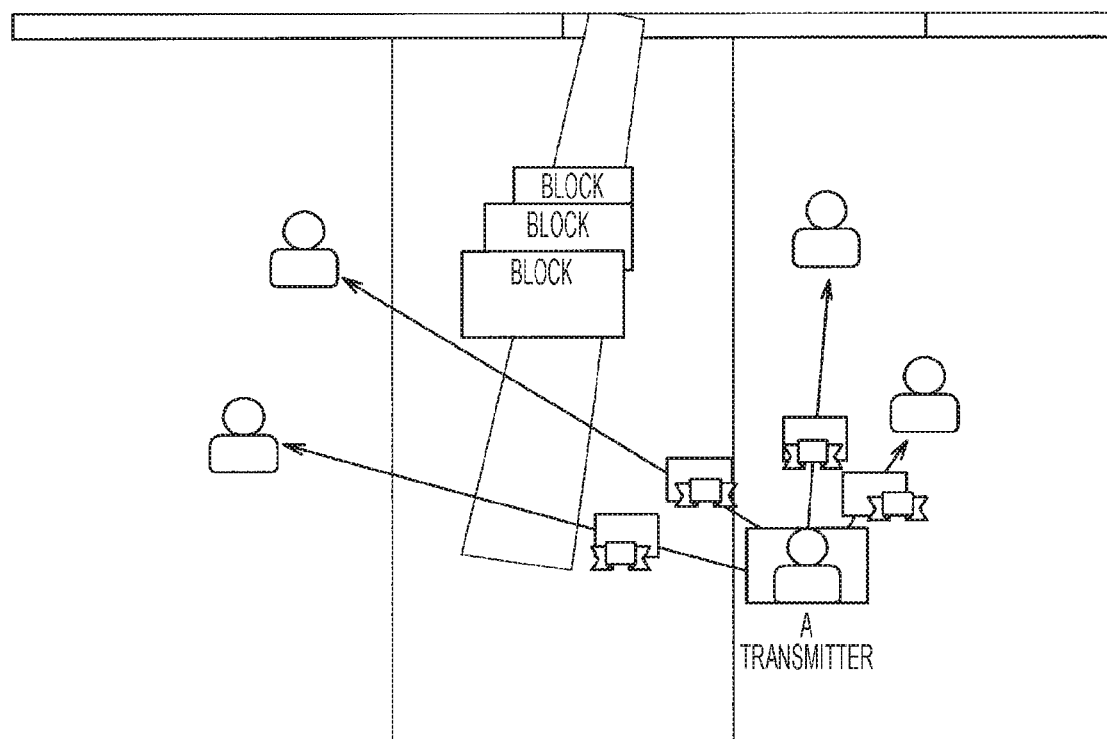
FIG. 2 is another diagram schematically illustrating the blockchain system according to the embodiment of the present disclosure.

FIG. 2 is a diagram illustrating how target data is registered by a user A in the blockchain system. The user A electronically signs the target data to be registered in the blockchain data using a private key of the user A. Then, the user A broadcasts the transaction including the electronically signed target data on the network. This ensures that the owner of the target data is the user A.

Figure 3:
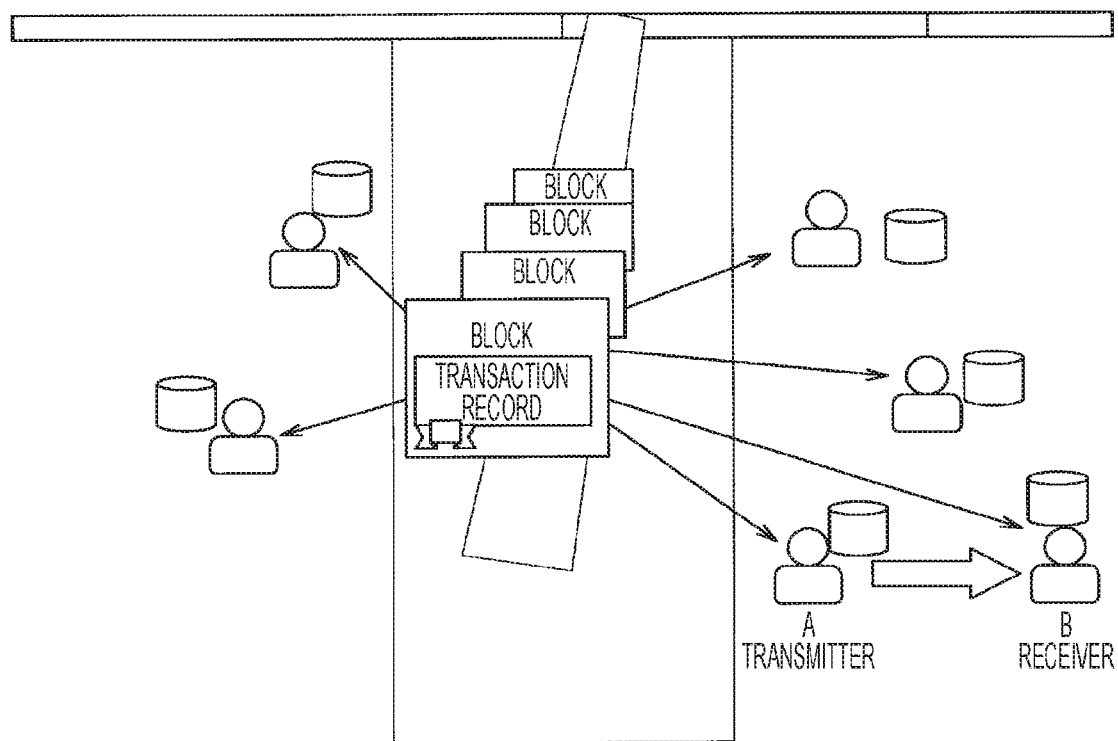
FIG. 3 is still another diagram schematically illustrating the blockchain system according to the embodiment of the present disclosure.

FIG. 3 is a diagram illustrating how the target data is migrated from the user A to a user B in the blockchain system. The user A electronically signs the transaction using the private key of the user A, and includes a public key of the user B in the transaction. This indicates that the target data has been migrated from the user A to the user B. Furthermore, upon the transaction of the target data, the user B may obtain a public key of the user A from the user A, and may obtain the electronically signed or encrypted target data.

Furthermore, in the blockchain system, by using a side chain technique, for example, it is possible to include, in the blockchain data used to exchange data of existing virtual currency such as the blockchain data of Bitcoin, other target data different from the virtual currency. Here, the other target data different from the virtual currency in the present embodiment is information associated with a learning unit certified on the basis of learning of a user and/or evaluation information used to certify the learning unit.

As described above, blockchain data is used to manage the information associated with a learning unit certified on the basis of learning of the user and/or the evaluation information used to certify the learning unit to be described later, whereby the information is held on the network without being tampered. Furthermore, with the blockchain data being used, a third party who wishes to use the information included in the blockchain can access the information included in the blockchain on the basis of predetermined authority.

<1. Overview of Learning Evaluation System>

The foregoing has described the blockchain system used in a learning evaluation system according to the embodiment of the present disclosure. Hereinafter, an overview of the learning evaluation system according to the embodiment of the present disclosure will be described.

Figure 4:
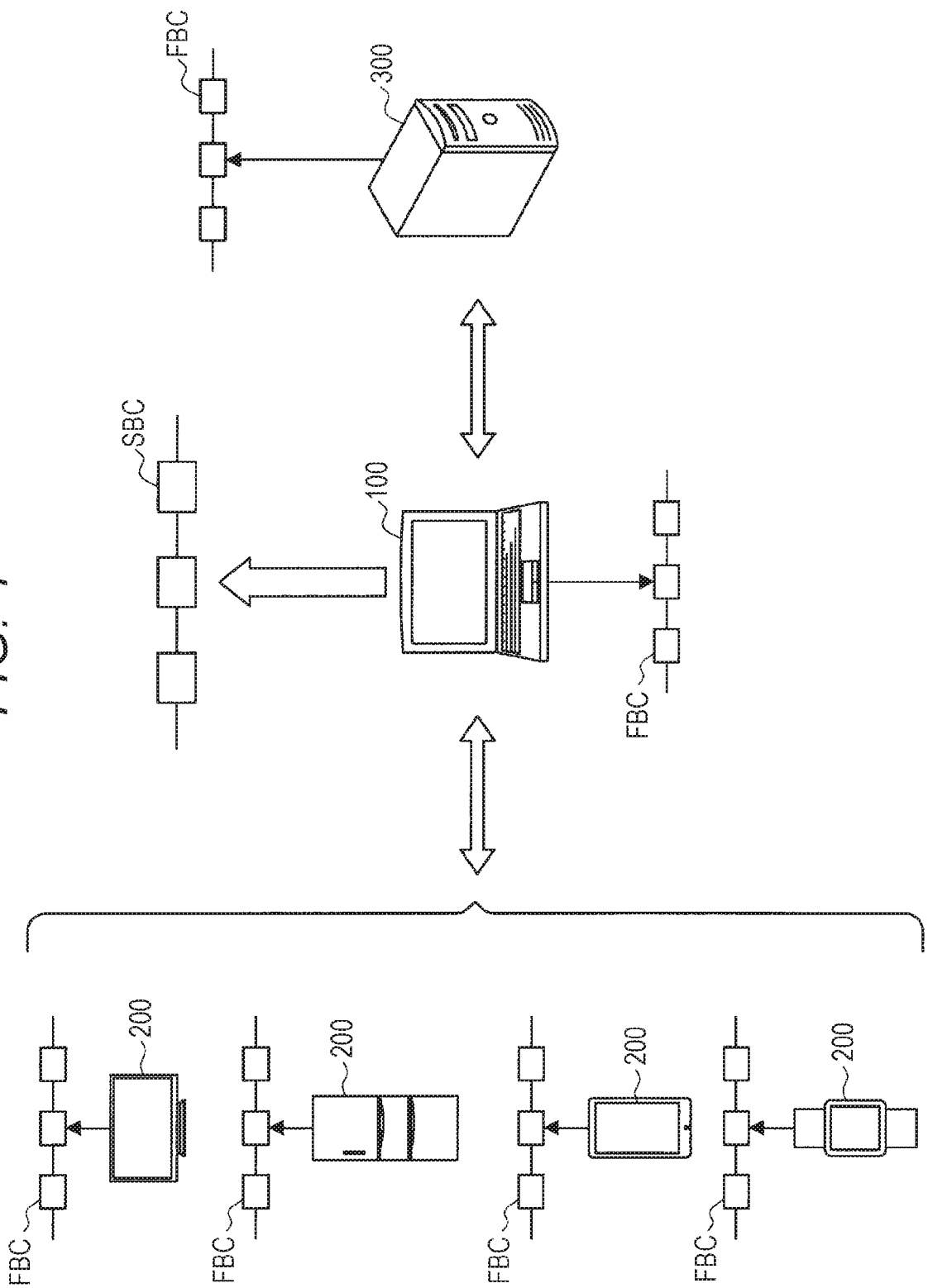
FIG. 4 is a diagram schematically illustrating a configuration of a learning evaluation system according to the embodiment of the present disclosure.

FIG. 4 is a diagram illustrating a configuration of the learning evaluation system according to the present embodiment. The learning evaluation system according to the present embodiment includes an evaluation device 100, an acquisition device 200, and a server 300. Note that the evaluation device 100, the acquisition device 200, and the server 300 are an example of an information processing apparatus that executes information processing according to the present embodiment.

The evaluation device 100 is a device used by the user for learning. For example, the user learns by, using the evaluation device 100, reading a book (e.g., textbook), viewing a video, or the like. Furthermore, the evaluation device 100 evaluates the learning of the user on the basis of evaluation information for evaluating the learning of the user obtained by each device included in the learning evaluation system. Note that the evaluation device 100 may be, for example, a laptop computer.

For example, the evaluation device 100 obtains information associated with content such as a book or a video used for learning as evaluation information used for the learning of the user. The evaluation information associated with content obtained by the evaluation device 100 includes, for example, information associated with a type of content (text data, image data, or audio data), a creator of content, data volume of content, a file name of content, and the like.

Furthermore, the evaluation device 100 obtains, as evaluation information used for learning of the user, information associated with actions of the user on the basis of information from an imaging unit or a microphone. Here, the information associated with actions of the user obtained from the imaging unit may include information associated with a line of sight of the user. Furthermore, the information associated with actions of the user obtained from the imaging unit may include information associated with presence of the user. The information associated with presence of the user may be, for example, information indicating that the user is present around the evaluation device 100 on the basis of face recognition being performed. Furthermore, the information associated with actions of the user obtained from the microphone may include information associated with utterance of the user.

The acquisition device 200 is a device that obtains evaluation information used to evaluate the learning of the user. The acquisition device 200 obtains the evaluation information using a built-in sensor or the like. The evaluation information obtained by the acquisition device 200 includes, for example, information associated with actions of the user, biological information of the user, information associated with a usage status of the acquisition device 200, and the like. Furthermore, the acquisition device 200 may be connected to the evaluation device 100 by wire or wirelessly. For example, the acquisition device 200 may start to obtain the evaluation information on the basis of an instruction from the evaluation device 100. The evaluation device 100 may transmit an instruction to obtain the evaluation information to the acquisition device 200 at the time when learning of the user starts in the evaluation device 100.

As illustrated in FIG. 4, the acquisition device 200 includes a stationary device whose installation location is less likely to be changed, such as a television, and a refrigerator, and a portable device whose location is likely to be changed, such as a mobile phone, and a wearable device. Note that the acquisition device 200 mentioned above is an example, and is not limited thereto. For example, the acquisition device 200 may include a ceiling light, a microwave, an audiovisual apparatus, and the like.

The server 300 provides the evaluation device 100 with content used for learning of the user. The content used for learning may be text data, image data, or audio data. Specifically, the content used for learning may be text data of a textbook, or animation data or audio data of a lecture. Furthermore, the server 300 obtains the information associated with content used for learning as evaluation information. The information associated with content obtained by the server 300 includes, for example, information associated with a type of content (text data, image data, or audio data), a creator of content, data volume of content, a file name of content, and the like. Note that the server 300 is an example of the acquisition device 200 in that the evaluation information is obtained.

In the learning evaluation system according to the present embodiment, the evaluation device 100 evaluates the learning performed by the user on the basis of the evaluation information obtained from each device included in the system. For example, the learning performed by the user is evaluated on the basis of the information associated with actions of the user obtained from the evaluation device 100 and/or the acquisition device 200.

In this manner, the learning performed by the user is evaluated on the basis of the information associated with actions of the user, whereby, for example, a learning unit can be prevented from being certified for the user in the case where the user is not concentrating on the learning.

Furthermore, in the learning evaluation system according to the present embodiment, the learning performed by the user is evaluated on the basis of the evaluation information obtained from the server 300. For example, the learning performed by the user is evaluated on the basis of information associated with data volume of the content obtained from the server 300.

In this manner, the learning performed by the user is evaluated on the basis of the information associated with data volume of the content used for the learning, whereby, for example, a learning unit can be prevented from being certified for the user on the basis of content with volume not sufficient enough to certify the learning unit. Accordingly, the learning unit is prevented from being certified in the case where the user has not made sufficient effort to obtain the learning unit.

As described above, in the learning evaluation system according to the present embodiment, learning of a learner is evaluated on the basis of wide-ranging information obtained by the evaluation device 100, the acquisition device 200, and the server 300. Accordingly, in the learning evaluation system according to the present embodiment, a learning unit is certified properly in the case where the user has made sufficient effort to obtain the learning unit.

Furthermore, in the learning evaluation system according to the present embodiment, an information processing apparatus having a general configuration such as the evaluation device 100, the acquisition device 200, and the server 300 is used, whereby learning of the user is evaluated with a simple configuration.

Furthermore, in the learning evaluation system according to the present embodiment, the evaluation information obtained by each device included in the system is registered in a blockchain that is an example of the P2P database by each device. That is, the evaluation device 100, each acquisition device 200, and the server 300 register the obtained evaluation information in a first blockchain denoted by "FBC" in FIG. 4. Then, the evaluation device 100 evaluates learning of the user on the basis of the evaluation information registered in each first blockchain.

In a case where the evaluation device 100 evaluates that the learning performed by the user is sufficient to certify the learning unit, the evaluation device 100 registers the information associated with the learning unit and/or the evaluation information used to certify the learning unit in a second blockchain denoted by "SBC" in FIG. 4.

As described above, blockchain data is used to manage the information associated with the learning unit certified on the basis of learning of the user and/or the evaluation information used to certify the learning unit, whereby the information is held on the network without being tampered. Furthermore, with the blockchain data being used, a third party who wishes to use the information included in the blockchain can access the information included in the blockchain on the basis of predetermined authority.

<2. Configuration of Devices Included in Learning Evaluation System>

The foregoing has described the overview of the learning evaluation system according to the embodiment of the present disclosure. Hereinafter, configurations of devices included in the learning evaluation system according to the embodiment of the present disclosure will be described.

<2-1. Configuration of Evaluation Device 100>

Figure 5:
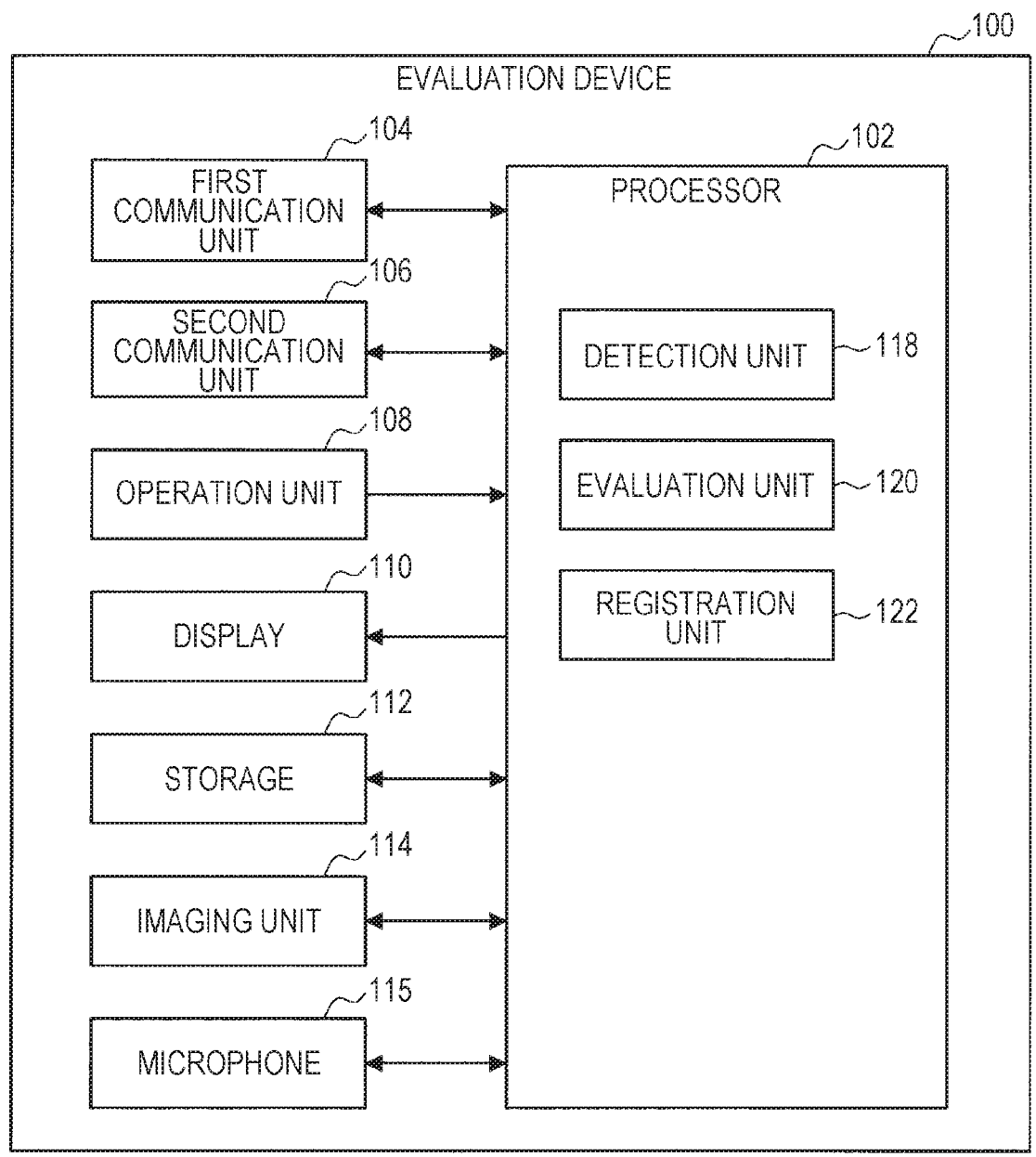
FIG. 5 is a block diagram illustrating an exemplary functional configuration of an evaluation device according to the embodiment of the present disclosure.

FIG. 5 is a diagram illustrating an exemplary configuration of the evaluation device 100 according to the present embodiment. The evaluation device 100 includes, for example, a processor 102, a first communication unit 104, a second communication unit 106, an operation unit 108, a display 110, a storage 112, an imaging unit 114, and a microphone 116. Furthermore, the processor 102 includes a detection unit 118, an evaluation unit 120, and a registration unit 122.

The processor 102 processes signals from each component of the evaluation device 100. For example, the processor 102 decodes the signals transmitted from the first communication unit 104 or the second communication unit 106, and extracts data. In addition, the processor 102 may process signals from the operation unit 108 to issue an instruction directed to an application to be executed in the processor 102. In addition, the processor 102 may also process data obtained from the imaging unit 114 or the microphone 116.

The first communication unit 104 is a communication unit that communicates with an external device by wired communication or wireless communication, which may perform communication using, for example, a communication scheme in conformity with Ethernet (registered trademark). Note that the communication schemes mentioned above are examples, and the communication scheme of the first communication unit 104 is not limited thereto.

The second communication unit 106 is a communication unit that communicates with an external device by near field communication, which may perform communication using, for example, a communication scheme (e.g., Bluetooth (registered trademark)) defined by the IEEE802 committee. In addition, the second communication unit 106 may perform communication using a communication scheme such as Wi-Fi. Note that the communication schemes mentioned above are examples, and the communication scheme of the second communication unit 106 is not limited thereto.

The operation unit 108 receives operation on the evaluation device 100 made by the user. The user operates the operation unit 108 to operate the application executed by the evaluation device 100, for example. In addition, the user operates the operation unit 108 to set various functions of the evaluation device 100.

The display 110 is used to display an image. For example, the display 110 displays an image related to content to be processed by the evaluation device 100. Furthermore, the display 110 may display an image based on the content obtained from the server 300. For example, the display 110 may display an electronic book obtained from the server 300. The storage 112 stores programs, such as an application to be executed by the evaluation device 100, and an operating system.

The imaging unit 114 is used to capture an image. For example, the imaging unit 114 is used to image the user. In particular, the imaging unit 114 may image an eye of the user. Then, the processor 102 may perform face recognition on the basis of image data from the imaging unit 114 to detect the user. Furthermore, the processor 102 may detect a line of sight of the user on the basis of image data from the imaging unit 114. Note that, since the imaging unit 114 is used to obtain evaluation information, it may be considered to be an example of the acquisition device 200. The microphone 116 obtains audio data from sounds around the evaluation device 100.

The detection unit 118 detects the acquisition device 200 connected to the evaluation device 100. For example, the detection unit 118 detects the acquisition device 200 connected to the evaluation device 100 on the basis of identification information sent from the acquisition device 200. Furthermore, the detection unit 118 detects that the user is learning (hereinafter also referred to as a learning event). For example, the detection unit 118 detects a learning event on the basis of information from the evaluation device 100.

Specifically, the detection unit 118 detects a learning event on the basis of the fact that the evaluation device 100 displays or reproduces text data, audio data, or animation data. For example, the detection unit 118 may analyze the header of the file of each data to recognize that the text data, audio data, or animation data is content related to learning on the basis of identification information (e.g., file creator, file name) related to each file. Furthermore, the detection unit 118 may analyze the header of each file to determine whether or not the content of each file is in association with a topic related to predetermined learning (e.g., subjects included in a school curriculum or syllabus).

Furthermore, the detection unit 118 may analyze text data, image data, or audio data obtained from the evaluation device 100 to detect a learning event. For example, the detection unit 118 converts the obtained text data into vector data using a vector space model. Furthermore, the detection unit 118 converts the obtained audio data into text data, and converts the converted text data into vector data. Then, the detection unit 118 may use the obtained vector data to determine whether or not the learning performed by the user is in association with a topic related to predetermined learning. Then, in a case where the learning of the user is in association with the topic related to the predetermined learning, the detection unit 118 may detect the learning event.

Note that, as described above, the topic may be a topic designated by a curriculum or a syllabus of a predetermined institution, such as a school, or may be a topic registered by the user in advance. Furthermore, topics may be classified into categories and sub-categories. For example, categories of topics may include foreign languages, mathematics, chemistry, physics, earth science, history, programming, cooking, engine control, mechanical engineering, meteorology, astronomy, animation, and the like. Furthermore, in a case where a category of topics is English, sub-categories of the topics may include, for example, the passive, use of prepositions, the present perfect, speaking, listening, and the like.

The evaluation unit 120 evaluates learning of the user on the basis of the evaluation information obtained by the evaluation device 100, the acquisition device 200, and the server 300. For example, the evaluation unit 120 evaluates the learning of the user on the basis of an evaluation table to be described later with reference to FIG. 9. Furthermore, the evaluation unit 120 certifies a learning unit based on the learning of the user on the basis of a result of the evaluation. Furthermore, the evaluation unit 120 may calculate credibility of the evaluation information on the basis of predetermined algorithm.

Here, the credibility of the evaluation information indicates credibility of the evaluation information used to evaluate the learning of the user. The credibility of the evaluation information may be calculated on the basis of a type or characteristic of the evaluation information, as will be described later. Furthermore, the credibility of the evaluation information may be calculated on the basis of a type or characteristic of the acquisition device 200 that has obtained the evaluation information. Furthermore, the credibility of the evaluation information may be calculated on the basis of a type or characteristic of the first blockchain in which the evaluation information is registered.

The registration unit 122 registers the evaluation information obtained by the evaluation device 100 in the first blockchain. For example, the registration unit 122 registers, in the first blockchain, evaluation information such as information associated with the content being learned, and information associated with actions of the user.

Furthermore, the registration unit 122 registers the information associated with the learning unit that has been certified in the second blockchain. As will be described later with reference to FIG. 11, the information associated with a learning unit includes, for example, any one of information associated with a topic, information associated with the acquisition device 200, information associated with credibility of evaluation information, information associated with a degree of understanding of the user, information associated with a learning time, and information associated with a learning method.

Here, the information associated with a degree of understanding of the user may be calculated on the basis of a score of an examination presented by the server 300 to certify the learning unit. Furthermore, the information associated with a learning method may include information indicating reading, participation in a lecture, viewing of a video, conversation, and the like.

<2-2. Configuration of Acquisition Device 200>

The foregoing has described the configuration of the evaluation device 100 according to the embodiment of the present disclosure. Hereinafter, a configuration of the acquisition device 200 according to the embodiment of the present disclosure will be described.

Figure 6:
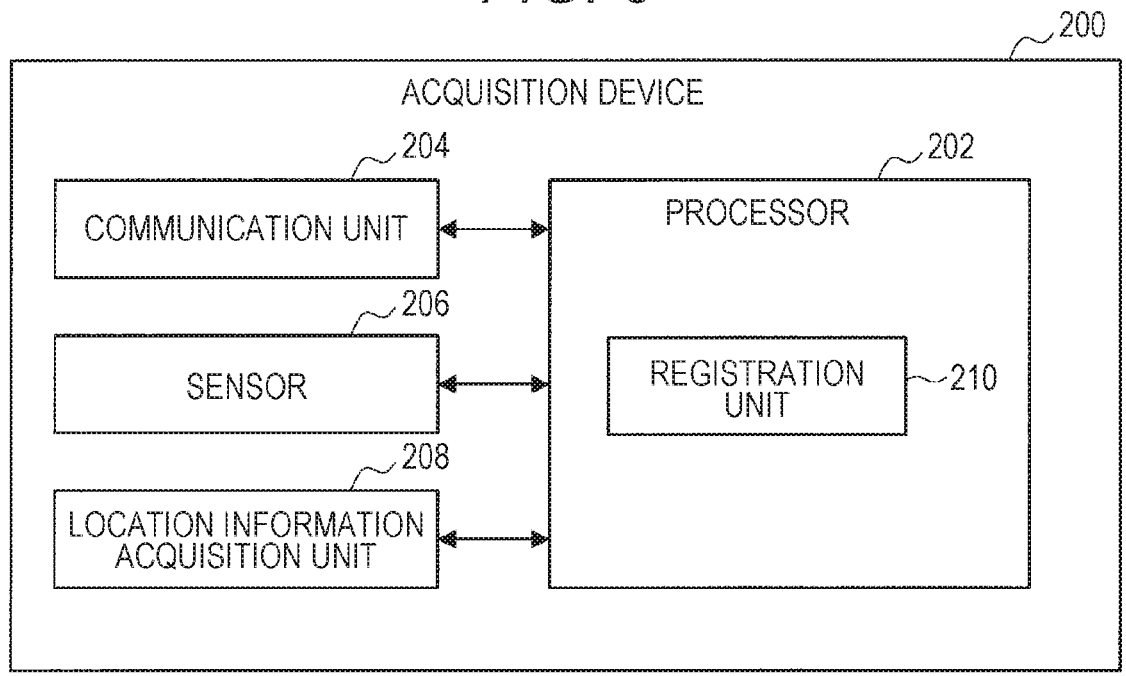
FIG. 6 is a block diagram illustrating an exemplary functional configuration of an acquisition device according to the embodiment of the present disclosure.

FIG. 6 is a diagram illustrating an exemplary configuration of the acquisition device 200 according to the present embodiment. The acquisition device 200 includes, for example, a processor 202, a communication unit 204, a sensor 206, and a location information acquisition unit 208. In addition, the processor 202 includes a registration unit 210.

The processor 202 processes signals from each component of the acquisition device 200. For example, the processor 202 encodes information transmitted from the communication unit 204. In addition, the processor 202 processes information obtained from the sensor 206.

The sensor 206 detects behavior of the acquisition device 200. For example, the sensor 206 includes an acceleration sensor, a gyroscope sensor, a barometer, a geomagnetic sensor, and the like. The acceleration sensor detects an acceleration level with respect to the acquisition device 200. The gyroscope sensor detects an angular acceleration level and an angular speed with respect to the acquisition device 200. The air pressure sensor detects the air pressure, and the height of the acquisition device 200 is calculated on the basis of the detected air pressure. The geomagnetic sensor detects geomagnetism, and the orientation of the acquisition device 200 is calculated on the basis of the detected geomagnetism.

The location information acquisition unit 208 obtains the location of the acquisition device 200. The location information acquisition unit 208 may obtain the location of the acquisition device 200 using, for example, a global navigation satellite system (GNSS). Further, the location information acquisition unit 208 may obtain the location of the acquisition device 200 on the basis of information from a base station of a cellular communication network.

The registration unit 210 registers the evaluation information obtained by the acquisition device 200 in the first blockchain. For example, the registration unit 210 registers, in the first blockchain, evaluation information such as information associated with actions of the user, biological information of the user, and information associated with a usage status of the acquisition device 200.

(2-3. Configuration of Server 300)

The foregoing has described the configuration of the acquisition device 200 according to the embodiment of the present disclosure. Hereinafter, a configuration of the server 300 according to the embodiment of the present disclosure will be described.

Figure 7:
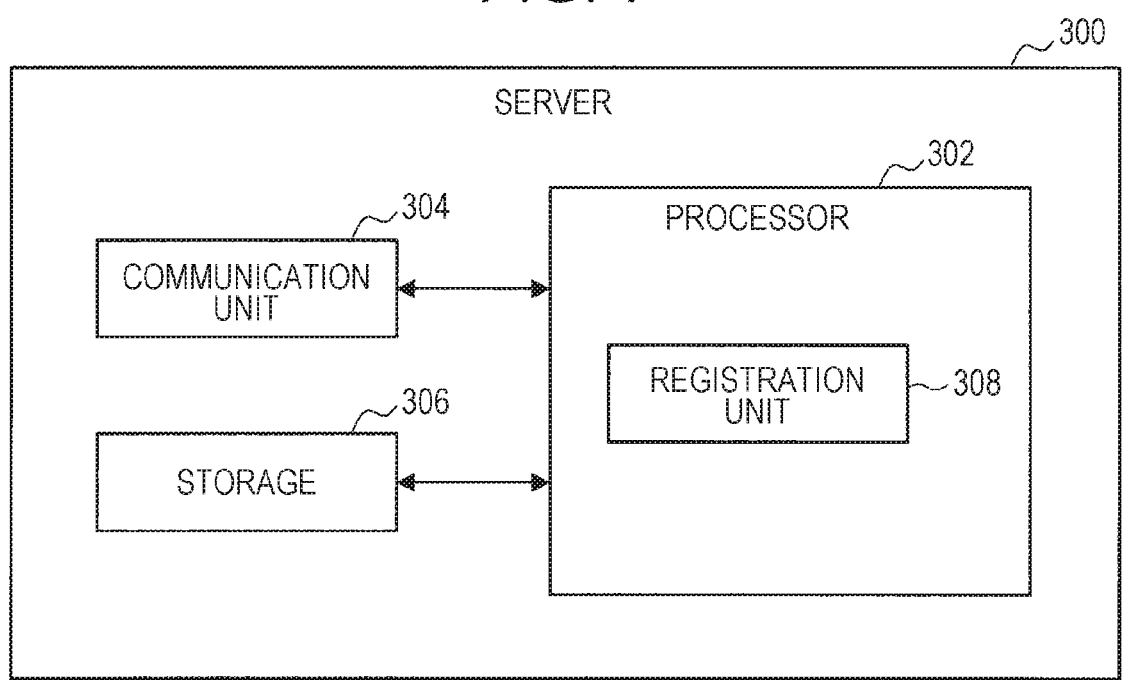
FIG. 7 is a block diagram illustrating an exemplary functional configuration of a server according to the embodiment of the present disclosure.

FIG. 7 is a diagram illustrating an exemplary configuration of the server 300 according to the present embodiment. The server 300 includes, for example, a processor 302, a communication unit 304, and a storage 306. In addition, the processor 302 includes a registration unit 308.

The processor 302 processes signals from each component of the server 300. For example, the processor 302 encodes information transmitted from the communication unit 304. In addition, the processor 302 reads data from the storage 306 to perform processing on the read data.

The communication unit 304 is a communication unit that communicates with an external device by wired communication or wireless communication, which may perform communication using, for example, a communication scheme in conformity with Ethernet (registered trademark). The storage 306 stores various kinds of data used by the processor 302. For example, the storage 306 stores content used for learning of the user. For example, the content used for learning may be text data of a textbook, or animation data or audio data of a lecture.

The registration unit 308 registers the evaluation information obtained by the server 300 in the first blockchain. For example, the registration unit 308 registers, in the first blockchain, evaluation information such as information associated with content used for learning of the user.

<3. Method for Processing Information in Learning Evaluation System>

The foregoing has described the configuration of each of the devices included in the learning evaluation system according to the embodiment of the present disclosure. Hereinafter, a method for processing information in the learning evaluation system according to the embodiment of the present disclosure will be described.

(3-1. Method for Processing Information Related to Evaluation Information Registration in First Blockchain)

Figure 8:
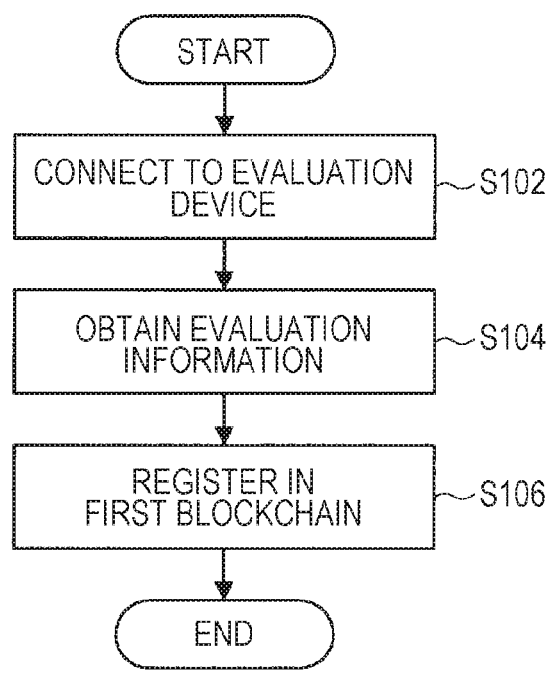
FIG. 8 is a flowchart illustrating an exemplary method for processing information according to the embodiment of the present disclosure.

FIG. 8 is a flowchart illustrating an exemplary method for processing information executed in the learning evaluation system according to the present embodiment. In particular, FIG. 8 illustrates a method for processing information related to registration of evaluation information in the first blockchain, which is performed by the evaluation device 100, the acquisition device 200, and the server 300.

First, in S102, the acquisition device 200 or the server 300 is connected to the evaluation device 100. Next, in 5104, each device obtains evaluation information. For example, the acquisition device 200 may start to obtain the evaluation information on the basis of an instruction from the evaluation device 100. Furthermore, the evaluation device 100 may obtain, for example, information associated with the content being displayed or reproduced on the evaluation device 100 or information associated with actions of the user as evaluation information. Furthermore, the information associated with the content may include, for example, information associated with a type of the content, a creator of the content, data volume of the content, a file name of the content, and the like. Furthermore, the information associated with actions of the user may include information associated with a line of sight of the user, information associated with presence of the user, and information associated with utterance of the user.

Furthermore, the acquisition device 200 obtains, as the evaluation information, information associated with actions of the user, biological information of the user, and information associated with a usage status of the acquisition device 200. In a case where the acquisition device 200 is a portable device, the information associated with actions of the user may include location information. Furthermore, the information associated with actions of the user may also include information indicating an exercise state of the user (e.g., information indicating that the user is walking, running, or lying on a bed or the like). Note that the exercise state of the user may be determined by pattern matching being performed using the information obtained from the sensor 206.

Furthermore, the biological information of the user may include information associated with a heart rate, blood pressure, an amount of sweating, a body temperature, brain waves, and the like. Furthermore, the information associated with a usage status of the acquisition device 200 may include, for example, information indicating that the power of the acquisition device 200 is turned on/off, and that the door of the acquisition device 200 is opened. Furthermore, the information associated with a usage status of the acquisition device 200 may include information indicating that content different from the content used for learning of the user is being reproduced/displayed on the acquisition device 200, or that the acquisition device 200 is being operated, and the like.

Furthermore, the server 300 obtains, as evaluation information, the information associated with content provided to the evaluation device 100. For example, the information associated with content may include information associated with a type of content, a creator of content, data volume of content, a file name of content, and the like.

Then, in S106, each device registers the obtained evaluation information in the first blockchain of each device. Note that the registration in the first blockchain may be performed at predetermined time intervals, or may be performed in real time. With the registration in the first blockchain being performed at predetermined time intervals, a processing load on each device is reduced. Furthermore, with the registration in the first blockchain being performed in real time, evaluation on learning of the user is performed in real time.

Furthermore, in FIG. 4, the first blockchain is set to each device. However, the first blockchain may be one blockchain. That is, each device may register evaluation information in one first blockchain for registration of evaluation information.

(3-2. Method for Processing Information Related to Registration in Second Blockchain)

The foregoing has described the method for processing information related to registration of the evaluation information in the first blockchain performed by the evaluation device 100, the acquisition device 200, and the server 300 according to the embodiment of the present disclosure. Hereinafter, a method for processing information related to registration of information associated with a learning unit in the second blockchain according to the embodiment of the present disclosure will be described.

Figure 9:
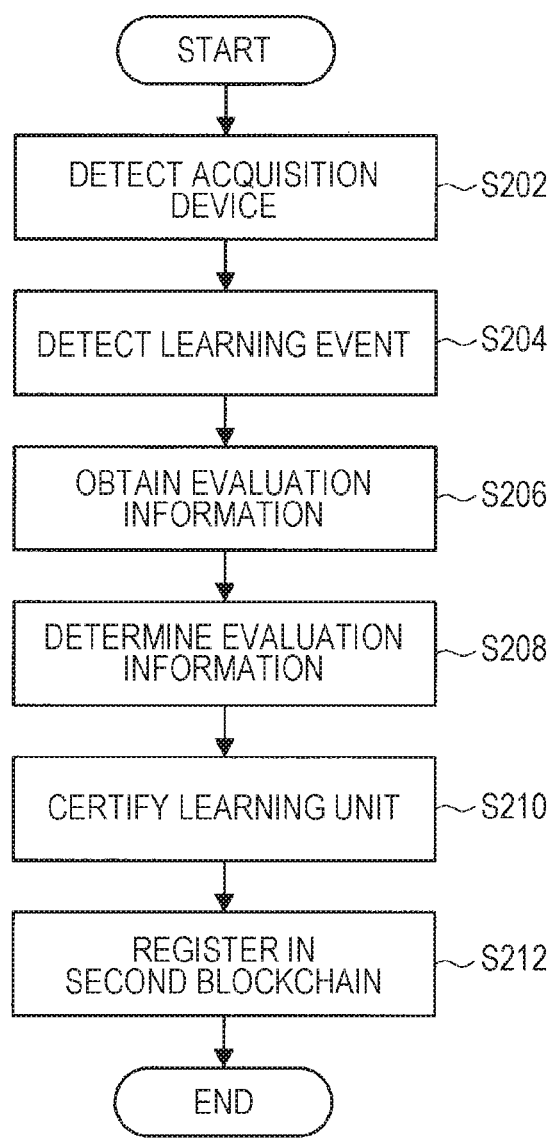
FIG. 9 is a flowchart illustrating an exemplary method for processing information according to the embodiment of the present disclosure.

FIG. 9 is a flowchart illustrating an exemplary method for processing information executed in the learning evaluation system according to the present embodiment. In particular, FIG. 9 illustrates a method for processing information related to evaluation of learning of the user and a method for processing information related to registration of information associated with a learning unit in the second blockchain performed by the evaluation device 100.

In S202, the detection unit 118 detects the acquisition device 200. For example, the detection unit 118 detects the acquisition device 200 connected to the evaluation device 100 on the basis of identification information sent from the acquisition device 200.

Next, in S204, the detection unit 118 detects a learning event. Here, as described above, the detection unit 118 may analyze the header information of the file of the content used by the user for learning to detect the learning event. Furthermore, the detection unit 118 may analyze the content using the vector space model to detect the learning event. Furthermore, at this time, the detection unit 118 may determine a related topic of the learning event.

Note that, as described above, the topic may be a topic designated by a curriculum or a syllabus of a predetermined institution, such as a school, or may be a topic registered by the user in advance. Furthermore, topics may be classified into categories and sub-categories. For example, categories of topics may include foreign languages, mathematics, chemistry, physics, earth science, history, programming, cooking, engine control, mechanical engineering, meteorology, astronomy, animation, and the like. Furthermore, in a case where a category of topics is English, sub-categories of the topics may include, for example, the passive, use of prepositions, the present perfect, speaking, listening, and the like.

Then, in S206, the evaluation unit 120 obtains evaluation information from each of the first blockchains. Here, as described above, information associated with actions of the user, biological information of the user, information associated with content, and information associated with a usage status of the acquisition device 200 are obtained as the evaluation information obtained from each of the first blockchains.

Furthermore, the evaluation unit 120 may obtain information other than the information mentioned above as the evaluation information. For example, the evaluation unit 120 may obtain information associated with a type or characteristic of the acquisition device 200 as the evaluation information. The type of the acquisition device 200 may include information indicating a portable device or a stationary device, and information associated with a name of the acquisition device 200. Here, a portable device such as a mobile phone may be lent to another person by the user, whereby evaluation information obtained from the portable device may not be suitable for monitoring actions of the user. On the other hand, a stationary device such as a refrigerator is unlikely to be lent to another person, whereby it may be suitable for monitoring actions of the user. In this manner, a level regarding whether or not it is suitable for evaluating learning of the user may differ depending on the type or characteristic of the acquisition device 200. Therefore, with the information associated with a type of the acquisition device 200 being used as the evaluation information, evaluation on the learning of the user is performed more properly.

Furthermore, the evaluation unit 120 may obtain information associated with a first blockchain as the evaluation information. For example, the information associated with a first blockchain may include information associated with a type or characteristic of the first blockchain. Furthermore, the information associated with a type or characteristic of the first blockchain may include the number of blocks included in the first blockchain in association with a learning event (e.g., video viewing of a predetermined lecture) that is an evaluation target.

The first blockchain may include a first blockchain privately operated by the user, and a first blockchain operated by an business operator or the like. The first blockchain privately operated by the user may be tampered by the user, whereby evaluation information obtained from the private first blockchain may not be suitable for monitoring actions of the user. On the other hand, the first blockchain operated by a business operator or the like is less likely to be tampered by the user, whereby evaluation information obtained from the private first blockchain may be suitable for monitoring actions of the user. In this manner, a level regarding whether or not it is suitable for evaluating learning of the user may differ depending on the type or characteristic of the first blockchain. Therefore, with the information associated with a first blockchain being used as the evaluation information, evaluation on the learning of the user is performed more properly.

Next, in S208, the evaluation unit 120 evaluates learning performed by the user on the basis of the obtained evaluation information. For example, the evaluation unit 120 may evaluate the learning on the basis of the evaluation table for performing evaluation.

FIG. 10 is a diagram illustrating an exemplary evaluation table used by the evaluation unit 120 to evaluate learning. As illustrated in FIG. 10, for example, a device condition and an evaluation condition corresponding to each learning method may be set in the evaluation table. Here, the evaluation condition indicates a condition used to certify the learning unit obtained from the evaluation information. Furthermore, the device condition is a condition related to a device used to obtain the evaluation information used to certify the learning unit.

The evaluation on the learning performed by the evaluation unit 120 will be performed with reference to the example of FIG. 10. For example, in a case where a learning method is video viewing, the evaluation condition may be that "the viewed video is a video related to a predetermined topic", "no viewing of another video is detected", "no movement of the user is detected", or "a public first blockchain is included".

Furthermore, the device condition may be that a wearable device and the server 300 are connected, or that evaluation information from the wearable device and the server 300 is obtained.

Under the evaluation condition described above, for example, the situations in which "the viewed video is a video related to a predetermined topic" and "no viewing of another video is detected" may be determined on the basis of the information associated with content obtained by the evaluation device 100 and the server 300. Specifically, the evaluation unit 120 may determine that "no viewing of another video is detected" on the basis of comparison between the information associated with content obtained from the evaluation device 100 and the information associated with content obtained from the server 300. Furthermore, the evaluation unit 120 may determine that a plurality of pieces of content is being displayed or reproduced on the evaluation device 100 on the basis of the information associated with content obtained from the evaluation device 100, thereby determining that "no viewing of another video is detected".

Furthermore, the situation in which "no movement of the user is detected" may be determined on the basis of the information associated with actions of the user obtained by the wearable device that is an example of the acquisition device 200. Furthermore, the situation in which "a public first blockchain is included" may be determined on the basis of the information associated with the first blockchain in which the obtained evaluation information has been registered.

Furthermore, in a case where the learning method is reading, the evaluation condition may be that "the read book is a book related to a predetermined topic", "no movement of the user is detected", "no use of a stationary device is detected", or "the line of sight of the user is directed to the evaluation device 100".

Furthermore, the device condition may be that a wearable device, an imaging device, and a plurality of stationary devices are connected, or that evaluation information from the wearable device, the imaging device, or the plurality of stationary devices is obtained.

Under the evaluation condition described above, for example, the situation in which "the read book is a book related to a predetermined topic" may be determined on the basis of the information associated with content obtained by the evaluation device 100. Furthermore, the situation in which "no movement of the user is detected" may be determined on the basis of the information associated with actions of the user obtained by the wearable device that is an example of the acquisition device 200. Furthermore, the situation in which "no use of a stationary device is detected" may be determined on the basis of the information associated with a usage status of the acquisition device 200 obtained by a stationary device, such as a refrigerator, which is an example of the acquisition device 200. Furthermore, the situation in which "the line of sight of the user is directed to the evaluation device 100" may be evaluated on the basis of information associated with the line of sight of the user obtained by the imaging unit 114 of the evaluation device 100.

Furthermore, in a case where the learning method is participation in a lecture, the evaluation condition may be that "the taken lecture is a lecture related to a predetermined topic", "no movement of the user is detected", or "no use of the acquisition device 200 is detected".

Furthermore, the device condition may be that a smartphone and a wearable device are connected, or that evaluation information from the smartphone and the wearable device is obtained.

Under the evaluation condition described above, for example, the situation in which "the taken lecture is a lecture related to a predetermined topic" may be determined by the detection unit 118 analyzing audio data or the like of the lecture using a space vector model. Furthermore, the situation in which "no movement of the user is detected" may be determined on the basis of the information associated with actions of the user obtained by the wearable device that is an example of the acquisition device 200. Furthermore, the situation in which "no use of the acquisition device 200 is detected" may be determined on the basis of the information associated with a usage status of the acquisition device 200 obtained by a smartphone that is an example of the acquisition device 200.

Referring back to FIG. 9, the learning unit is certified in S210 on the basis of the determination result of the evaluation information using the evaluation table in S208. For example, in a case where the evaluation condition and the device condition illustrated in FIG. 10 are satisfied by the evaluation information obtained from each of the first blockchains, the evaluation unit 120 certifies the learning unit.

Then, the registration unit 122 registers the information associated with the learning unit certified in S210 in the second blockchain. FIG. 11 is exemplary information associated with a learning unit to be registered in the second blockchain in S210.

In the learning evaluation system according to the present embodiment, information associated with a certified learning unit as illustrated in FIG. 11 is registered in place of transaction information of an existing blockchain such as Bitcoin, or in association with transaction information of an existing blockchain such as Bitcoin.

As illustrated in FIG. 11, in the learning evaluation system according to the present embodiment, for example, information associated with a user ID, a topic (category and sub-category), an acquisition device 200 used for evaluation, credibility of evaluation information, a degree of understanding of the user, a learning time, and a learning method may be registered in the second blockchain.

As described above, categories of topics may include foreign languages, mathematics, chemistry, physics, earth science, history, programming, cooking, engine control, mechanical engineering, meteorology, astronomy, animation, and the like. Furthermore, in a case where a category of topics is English, sub-categories of the topics may include, for example, the passive, use of prepositions, the present perfect, speaking, listening, and the like. In this manner, topics are classified into categories and sub-categories, whereby the learning is managed in more detail.

Furthermore, a used device is information associated with the device used for learning. That is, it is information associated with the device from which the evaluation device 100 obtains the evaluation information used for the evaluation. In FIG. 10, a wearable device and a refrigerator are shown as the acquisition device 200 used to evaluate the learning of the user. Note that the used device may include the imaging unit 114 of the evaluation device 100, and the like.

The credibility of the evaluation information includes information associated with credibility of the evaluation information used to evaluate the learning of the user. As described above, a portable device such as a mobile phone may be lent to another person by the user, whereby evaluation information obtained from the portable device may not be suitable for monitoring actions of the user. On the other hand, a stationary device such as a refrigerator is unlikely to be lent to another person, whereby it may be suitable for monitoring actions of the user. Therefore, the credibility of the evaluation information obtained by a portable device may be set lower, and the credibility of the evaluation information obtained by a stationary device may be set lower. That is, the credibility of the evaluation information may be calculated on the basis of a type or characteristic of the acquisition device 200 that has obtained the evaluation information. Note that a type or characteristic of the acquisition device 200 that has obtained the evaluation information may be determined on the basis of information indicating that the acquisition device 200 is a portable device, or that the acquisition device 200 is a stationary device.

Furthermore, the evaluation information (e.g., information associated with actions of the user or biological information of the user) obtained by the wearable device may not be suitable for monitoring actions of the user since the wearable device may be lent to another person. Meanwhile, the evaluation information (e.g., information indicating presence of the user or information associated with a line of sight of the user) obtained by the imaging unit 114 of the evaluation device 100 in which learning is performed is information that cannot be substituted by another person, whereby it may be suitable for monitoring actions of the user. Therefore, the credibility of the evaluation information obtained by the imaging unit 114 of the evaluation device 100 in which learning is performed may be set higher. That is, the credibility of the evaluation information may be calculated on the basis of a type or characteristic of the evaluation information.

Furthermore, as described above, the first blockchain privately operated by the user may be tampered by the user, whereby the credibility of the evaluation information may be set lower. On the other hand, the first blockchain operated by a business operator or the like is less likely to be tampered by the user, whereby the credibility of the evaluation information may be set higher. That is, the credibility of the evaluation information may be calculated on the basis of a type or characteristic of the first blockchain in which the evaluation information is registered. Note that, as described above, the level of reliability of the first blockchain differs depending on the operation entity of the first blockchain. Therefore, the evaluation unit 120 may set the credibility of the evaluation information on the basis of information associated with the operation entity of the first blockchain.

Furthermore, the evaluation unit 120 may set the credibility of the evaluation information on the basis of information associated with the number of blocks included in the first blockchain in association with the learning event (e.g., video viewing of a predetermined lecture) that is an evaluation target. Specifically, as the number of blocks included in the first blockchain is larger, the credibility of the evaluation information obtained from the first blockchain may be set higher. Note that the type or characteristic of the first blockchain may be determined on the basis of the information associated with the operation entity of the first blockchain or the information associated with the number of blocks included in the first blockchain.

By setting the credibility of the evaluation information as described above, the evaluation unit 120 may quantify the credibility of the evaluation information into numbers on the basis of predetermined algorithm. Then, information associated with the quantified credibility of the evaluation information may be registered in the second blockchain. Note that, in FIG. 11, the credibility of the evaluation information is indicated as 80 in the numerical value setting between 0 and 100. As described above, the credibility of the evaluation information is calculated, whereby information for securing evaluation on the learning of the user performed by the evaluation unit 120 is provided.

Furthermore, the degree of understanding may be determined on the basis of the score of an examination conducted on the user. Note that, in FIG. 11, the degree of understanding of the user is indicated as 75 in the numerical value setting between 0 and 100. Furthermore, in FIG. 11, the time until the learning unit is obtained is indicated as 10 hours with regard to the learning time. Furthermore, in FIG. 11, video viewing is indicated with regard to the learning method.

In this manner, the information associated with a learning unit is managed by the second blockchain, whereby the learning performed by the user is managed in the state in which the information is not tampered and a third party can easily use the information.

<4. Hardware Configuration of Evaluation Device>

Figure 12:
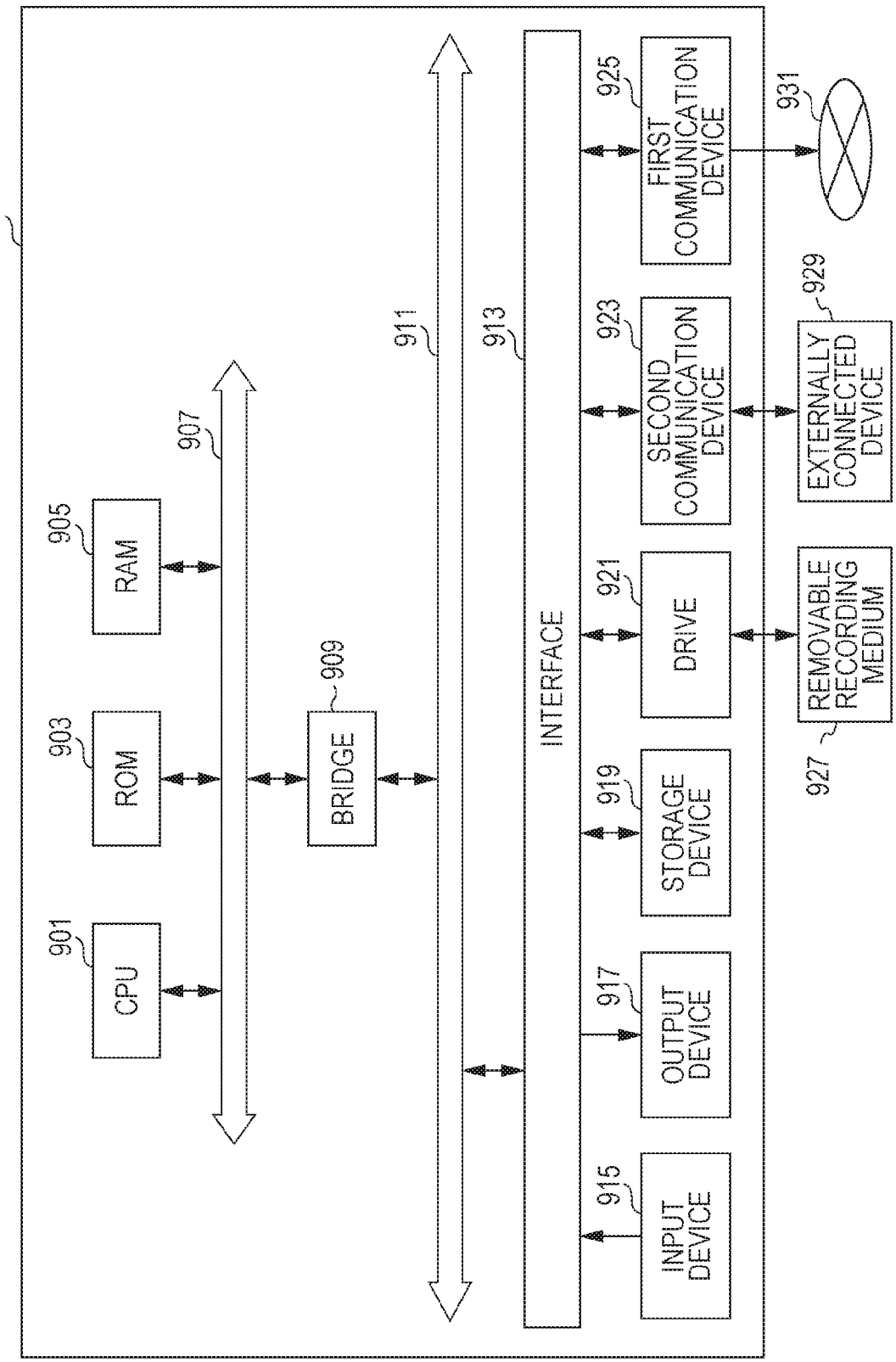
FIG. 12 is a diagram illustrating an exemplary hardware configuration of the evaluation device according to the embodiment of the present disclosure.

The foregoing has described the learning evaluation system and the method for processing information executed in the learning evaluation system according to the present embodiment. Hereinafter, a hardware configuration of the evaluation device will be described. FIG. 12 is a block diagram for illustrating the hardware configuration of the evaluation device 100 (e.g., laptop computer) according to the embodiment of the present disclosure.

The evaluation device 100 mainly includes a CPU 901, a ROM 903, and a RAM 905. Moreover, the evaluation device 100 further includes a host bus 907, a bridge 909, an external bus 911, an interface 913, an input device 915, an output device 917, a storage device 919, a drive 921, a second communication device 923, and a first communication device 925.

The CPU 901 functions as a main processing unit and a control unit, and controls overall operation in the evaluation device 100 or a part thereof in accordance with various programs recorded in the ROM 903, the RAM 905, the storage device 919, or a removable recording medium 927.

Note that the CPU 901 may have the function of the processor 102. The ROM 903 stores programs to be used by the CPU 901, operation parameters, and the like. The RAM 905 primarily stores programs to be used by the CPU 901, parameters that appropriately change in the execution of the programs, and the like. These are mutually connected by the host bus 907 including an internal bus such as a CPU bus.

The host bus 907 is connected to the external bus 911, such as a peripheral component interconnect/interface (PCI) bus, via the bridge 909.

The input device 915 is an operation means operated by the user, such as an electrostatic or a pressure-sensitive touch panel, button, switch, and jog dial. Moreover, the input device 915 includes, for example, an input control circuit or the like that generates input signals on the basis of information input by the user using the operation means mentioned above and outputs the signals to the CPU 901. The user can input various kinds of data or provide an instruction for processing operation to the evaluation device 100 by operating the input device 915. Note that the input device 915 may have the function of the operation unit 108.

The output device 917 includes a device capable of visually or aurally notifying the user of the obtained information. Examples of such a device include a display device such as a liquid crystal display device, an EL display device, and a lamp, an audio output device such as a speaker and a headphone, and the like. The output device 917 outputs, for example, results obtained through various kinds of processing performed by the evaluation device 100. specifically, the display device displays the results obtained through various kinds of processing performed by the evaluation device 100 as text or images. Meanwhile, the audio output device converts audio signals including reproduced audio data, sound data, and the like into analog signals, and outputs them. Note that the display device of the output device 917 may have the function of the display 110.

The storage device 919 is a device for storing data used in the evaluation device 100. The storage device 919 includes, for example, a magnetic storage device such as a hard disk drive (HDD), a semiconductor storage device, an optical storage device, a magneto-optical storage device, or the like. The storage device 919 stores programs to be executed by the CPU 901, various kinds of data, various kinds of data obtained from the outside, and the like.

The drive 921 is a reader/writer for a recording medium, which is incorporated in or externally attached to the evaluation device 100. The drive 921 reads out information recorded in the attached removable recording medium 927, such as a magnetic disk, an optical disk, a magneto-optical disk, and a semiconductor memory, and outputs the information to the RAM 905. Furthermore, the drive 921 is also capable of writing a record in the attached removable recording medium 927, such as a magnetic disk, an optical disk, a magneto-optical disk, and a semiconductor memory. The removable recording medium 927 is, for example, a DVD medium, an HD-DVD medium, a Blu-ray (registered trademark) medium, or the like. Furthermore, the removable recording medium 927 may be a CompactFlash (CF) (registered trademark), a flash memory, a secure digital (SD) memory card, or the like. Furthermore, the removable recording medium 927 may be, for example, an integrated circuit (IC) card mounting a contactless IC chip, an electronic device, or the like.

The second communication device 923 is used to exchange data with an externally connected device on the basis of communication being established with an externally connected device 929. Examples of the second communication device 923 include an IEEE802.11 port, an IEEE802.15 port, and the like. By being connected to the externally connected device 929 using the second communication device, the evaluation device 100 directly obtains various kinds of data from the externally connected device 929, and transmits various kinds of data to the externally connected device 929.

The first communication device 925 is, for example, a communication interface including a communication device or the like for connecting to a communication network 931. The first communication device 925 is, for example, a communication card for wireless USB (WUSB), a wired or wireless local area network (LAN), or the like. Furthermore, the first communication device 925 may be a router for optical communication, a router for asymmetric digital subscriber line (ADSL), a modem for various kinds of communication, or the like. For example, the first communication device 925 is capable of transmitting and receiving signals or the like in accordance with a predetermined protocol, such as TCP/IP, with the Internet or another communication device. Furthermore, the communication network 931 to be connected to the first communication device 925 includes a network connected by wire or wirelessly, or the like, which may be, for example, the Internet, a home LAN, infrared communication, radio wave communication, satellite communication, or the like.

<5. Supplementary Items>

As described above, although the preferred embodiments of the present disclosure have been described in detail with reference to the accompanying drawings, the technical scope of the present disclosure is not limited to such examples. It is apparent to those skilled in the art of the present disclosure that various alterations and modifications can be conceived within the scope of the technical idea described in the appended claims, and such alterations and modifications are also naturally within the technical scope of the present disclosure.

For example, in the example described above, the evaluation unit 120 evaluates the learning of the user on the basis of the evaluation table illustrated in FIG. 10. However, the evaluation unit 120 may evaluate the learning of the user using the credibility of the evaluation information described above. For example, the evaluation unit 120 may use the evaluation information having a numerical value exceeding a predetermined value in the credibility of the evaluation information to evaluate the learning of the user. Therefore, the evaluation unit 120 may not necessarily certify the learning unit on the basis of the evaluation information having a numerical value equal to or less than the predetermined value.

Furthermore, certification of the learning unit and directed to the learning of the user has been performed by the evaluation device 100. However, the certification of the learning unit and directed to the learning of the user may be performed by the server 300. In other words, the server 300 may have the function of the evaluation unit 120 of the evaluation device 100. Furthermore, the server 300 may register the information associated with the learning unit that has been certified in the second blockchain. In other words, the server 300 may have the function of the registration unit 122 of the evaluation device 100.

Furthermore, in the example described above, each device included in the learning evaluation system according to the present embodiment registers the evaluation information in the first blockchain. However, the evaluation information may be managed in a different way. For example, each device included in the learning evaluation system may store the evaluation information in the storage of each device, and may transmit the evaluation information to the evaluation device 100 at the time when the evaluation device 100 performs on the learning of the user. Furthermore, each device included in the learning evaluation system may transmit the evaluation information to the server 300, and the server 300 may store and manage the received evaluation information in the storage 306. At this time, the server 300 may transmit the evaluation information to the evaluation device 100 at the time when the evaluation device 100 performs on the learning of the user. Furthermore, the server 300 may evaluate the learning of the user instead of the evaluation device 100.

Furthermore, in the example described above, the information associated with a learning unit is registered in the blockchain data. However, the information associated with a learning unit may be registered in a system other than the blockchain. For example, the information associated with a learning unit may be managed by a server group constructing a cloud system. Furthermore, the information associated with a learning unit may be managed by an existing P2P network.

Furthermore, the information processing in the evaluation device 100 according to the present embodiment may be executed by an information processing apparatus such as a tablet computer, a desktop computer, a PDA, and an in-vehicle device. In addition, the server 300 may not be connected to another device by wire, and may be a portable computer.

Furthermore, there may be provided a computer program that causes the processor 102 of the evaluation device 100, the processor 202 of the acquisition device 200, and the processor 302 of the server 300 to operate as described above with reference to FIGS. 8 and 9. Furthermore, a recording medium storing such a program may be provided.

<6. Conclusion>

As described above, in the learning evaluation system according to the present disclosure, evaluation on the learning performed by the user is carried out on the basis of the evaluation information obtained from each device included in the system. Therefore, in the learning evaluation system according to the present embodiment, learning of a learner is evaluated on the basis of wide-ranging information obtained by the evaluation device 100, the acquisition device 200, and the server 300. In this manner, the learning performed by the user is evaluated on the basis of the evaluation information obtained from each device, whereby the learning unit can be prevented from being certified for the user in the case where the user is not concentrating on the learning. Furthermore, the learning unit can be prevented from being certified for the user on the basis of content with volume not sufficient enough to certify the learning unit. Accordingly, the learning unit is prevented from being certified in the case where the user has not made sufficient effort to obtain the learning unit. Furthermore, in the learning evaluation system according to the present embodiment, an information processing apparatus having a general configuration such as the evaluation device 100, the acquisition device 200, and the server 300 is used, whereby learning of the user is evaluated with a simple configuration.

Furthermore, in a learning information management system according to the present disclosure, the evaluation information obtained by each device included in the system is registered in a blockchain by each device. Moreover, information associated with a learning unit to be certified on the basis of learning of the user and/or evaluation information used to certify the learning unit is registered in the blockchain. With each piece of information being registered in the blockchain, each piece of information is held on the network without being tampered. Furthermore, with the blockchain being used, a third party who wishes to use the information included in the blockchain can access the information included in the blockchain on the basis of predetermined authority.

Note that the following configurations are also within the technical scope of the present disclosure.

(1)

An information processing apparatus, including: a processor that obtains, from a first P2P database, evaluation information for evaluating learning of a user, which is obtained by an acquisition device, and performs evaluation on learning performed by the user on the basis of the evaluation information.

(2)

The information processing apparatus according to (1) described above, in which the processor obtains the evaluation information from the first P2P database set for each of the acquisition devices.

(3)

The information processing apparatus according to (1) or (2) described above, in which the processor is configured to:
calculate credibility of the evaluation information; and
perform the evaluation on the learning performed by the user using the credibility of the evaluation information.

(4)

The information processing apparatus according to (3) described above, in which the processor calculates the credibility of the evaluation information on the basis of any of a type or a characteristic of the evaluation information, a type or a characteristic of the acquisition device, or a type or a characteristic of the first P2P database.

(5)

The information processing apparatus according to (3) described above, in which the processor performs the evaluation on the learning performed by the user on the basis of the evaluation information having the credibility of the evaluation information exceeding a predetermined value.

(6)

The information processing apparatus according to (4) described above, in which the type or the characteristic of the acquisition device is determined on the basis of information indicating that the acquisition device is a portable device, or that the acquisition device is a stationary device.

(7)

The information processing apparatus according to (4) described above, in which the first P2P database is a first blockchain, and
a type or a characteristic of the first P2P database is determined on the basis of information associated with the number of blocks included in the first blockchain and information associated with an operation entity of the first blockchain.

(8)

The information processing apparatus according to any one of (1) to (7) described above, in which the evaluation information includes any one of information associated with action of the user, biological information of the user, information associated with a usage status of the acquisition device, and information associated with content.

(9)

The information processing apparatus according to (8) described above, in which the information associated with action of the user includes any one of information indicating presence of the user, information associated with a line of sight of the user, information associated with utterance of the user, and information indicating an exercise state of the user.

(10)

The information processing apparatus according to (8) described above, in which the biological information of the user includes information associated with a heart rate, blood pressure, an amount of sweating, a body temperature, and brain waves of the user.

(11)

The information processing apparatus according to (8) described above, in which the information associated with a usage status of the acquisition device includes any one of information indicating that power of the acquisition device is turned on or off, information indicating that content different from content used for the learning of the user is being reproduced/displayed on the acquisition device, and information indicating that the acquisition device is being operated.

(12)

The information processing apparatus according to (8) described above, in which the information associated with content includes information associated with a type of the content, a creator of the content, data volume of the content, and a file name of the content.

(13)

The information processing apparatus according to any one of (1) to (12) described above, in which the processor is configured to:

certify a learning unit on the basis of a result of the evaluation; and register information associated with the learning unit that has been certified in a second P2P database.

(14)

The information processing apparatus according to (13) described above, in which the information associated with the learning unit includes any one of information associated with a topic related to the learning performed by the user, information associated with the acquisition device used for the evaluation performed on the learning of the user, and information associated with credibility of the evaluation information.

(15)

A method for processing information that causes a computer to obtain, from a first P2P database, evaluation information for evaluating learning of a user, which is obtained by an acquisition device, and to perform evaluation on learning performed by the user on the basis of the evaluation information.

REFERENCE SIGNS LIST

100 Evaluation device
102 Processor
104 First communication unit
106 Second communication unit
108 Operation unit
110 Display
112 Storage
114 Imaging unit
116 Microphone
118 Detection unit
120 Evaluation unit
122 Registration unit
200 Acquisition device
202 Processor
204 Communication unit
206 Sensor
208 Location information acquisition unit
210 Registration unit
300 Server
302 Processor
304 Communication unit
306 Storage
308 Registration unit

The invention claimed is:

1. An information processing apparatus, comprising:
a processor configured to:
transmit an instruction, to an acquisition device, based on detection of start of learning of a user,
obtain, from a first peer to peer (P2P) database distributed in a P2P network, evaluation information to evaluate the learning of the user, wherein the evaluation information is obtained by the acquisition device and registered in the first P2P database, based on the instruction, wherein
the evaluation information is registered in the first P2P database upon application of an electronic signature with a private key of the acquisition device, and
the evaluation information includes a public key of the information processing apparatus, and
evaluate the learning performed by the user based on the evaluation information obtained from the first P2P database, wherein the evaluation includes:
comparison of the evaluation information obtained from the first P2P database with corresponding predetermined information obtained from a server.

2. The information processing apparatus according to claim 1, wherein
the processor obtains the evaluation information from the first P2P database that is set for a plurality of acquisition devices comprising the acquisition device.

3. The information processing apparatus according to claim 1, wherein
the processor is further configured to:
calculate credibility of the evaluation information, associated with the learning performed by the user, wherein the credibility is calculated based on a predetermined value, and
perform the evaluation on the learning performed by the user based on the credibility of the evaluation information.

4. The information processing apparatus according to claim 3, wherein
the processor calculates the credibility of the evaluation information on a basis of any of: a type or a characteristic of the evaluation information, a type or a characteristic of the acquisition device, or a type or a characteristic of the first P2P database.

5. The information processing apparatus according to claim 3, wherein
the processor performs the evaluation on the learning performed by the user on a basis of the evaluation information having the credibility of the evaluation information exceeding the predetermined value.

6. The information processing apparatus according to claim 4, wherein
the type or the characteristic of the acquisition device is determined on a basis of information indicating that the acquisition device is a portable device, or that the acquisition device is a stationary device.

7. The information processing apparatus according to claim 4, wherein
the first P2P database is a first blockchain, and the type or the characteristic of the first P2P database is determined on a basis of information associated with a number of blocks included in the first blockchain and information associated with an operation entity of the first blockchain.

8. The information processing apparatus according to claim 1, wherein
the evaluation information includes any one of: information associated with an action of the user, biological information of the user, information associated with a usage status of the acquisition device, and information associated with content.

9. The information processing apparatus according to claim 8, wherein
the information associated with the action of the user includes any one of: information indicating presence of the user, information associated with a line of sight of the user, information associated with utterance of the user, and information indicating an exercise state of the user.

10. The information processing apparatus according to claim 8, wherein
the biological information of the user includes information associated with a heart rate, blood pressure, an amount of sweating, a body temperature, and brain waves of the user.

11. The information processing apparatus according to claim 8, wherein
the information associated with the usage status of the acquisition device includes any one of: information indicating that power of the acquisition device is turned on or off, information indicating that content different from content used for the learning of the user is being reproduced/displayed on the acquisition device, and information indicating that the acquisition device is being operated.

12. The information processing apparatus according to claim 8, wherein
the information associated with the content includes information associated with a type of the content, a creator of the content, data volume of the content, and a file name of the content.

13. The information processing apparatus according to claim 1, wherein
the processor is further configured to:
certify a learning unit on a basis of a result of the evaluation, and
register information associated with the learning unit in a second P2P database, distributed in the P2P network, based on the certification of the learning unit.

14. The information processing apparatus according to claim 13, wherein
the information associated with the learning unit includes any one of: information associated with a topic related to the learning performed by the user, information associated with the acquisition device used for the evaluation performed on the learning of the user, and information associated with credibility of the evaluation information determined based on a predetermined value.

15. A method for processing information that causes a computer to perform:
transmitting an instruction, to an acquisition device, based on detection of start of learning of a user,
obtaining, from a first peer to peer (P2P) database distributed in a P2P network, evaluation information to evaluate the learning of the user, wherein the evaluation information is obtained by the acquisition device and registered in the first P2P database, based on the instruction, wherein
the evaluation information is registered in the first P2P database upon application of an electronic signature with a private key of the acquisition device, and
the evaluation information includes a public key of an information processing apparatus, and
evaluate the learning performed by the user based on the evaluation information obtained from the first P2P database, wherein the evaluation includes:
comparison of the evaluation information obtained from the first P2P database with corresponding predetermined information obtained from a server.

16. The information processing apparatus according to claim 1, wherein
the processor is further configured to:
detect the start of learning of the user based on reproduction of content, including any one of: text data, audio data, or animation data, on a display.

17. The information processing apparatus according to claim 16, wherein
the processor is further configured to:
convert the reproduced content into vector data using a vector space model, wherein the processor detects the start of the learning of the user based on the vector data that determines that the learning performed by the user is in association with a topic related to a predetermined learning.

18. The information processing apparatus according to claim 1, wherein the processor is further configured to:
quantify credibility of the evaluation information into a numerical value on a basis of: a type or a characteristic of the evaluation information, a type or a characteristic of the acquisition device, or a type or a characteristic of the first P2P database, and
perform the evaluation on the learning performed by the user on a basis of the numerical value.

19. The information processing apparatus according to claim 1, wherein
the evaluation information includes information associated with physical action of the user obtained via an imaging device or a microphone, and biological information of the user obtained via a wearable device or the imaging device.

* * * * *